United States

Le Noane et al.

4,043,854
Aug. 23, 1977

[54] METHOD AND APPARATUS FOR SPLICING OPTICAL FIBER CABLES

[76] Inventors: Georges E. Le Noane, Batiment C, 43 Ar Sante; André M. Mathern, route du Busquet, Brelevenez; Gabrielle Morizur, Les Fontaines, batiment L, n°' 141, all of Lannion, France, 22300

[21] Appl. No.: 744,595

[22] Filed: Nov. 24, 1976

[30] Foreign Application Priority Data

Nov. 26, 1975    France ..................... 75.36176

[51] Int. Cl.$^2$ ............... B65H 69/02; G02B 5/16
[52] U.S. Cl. ............................. 156/158; 29/628; 156/159; 156/304; 156/502; 174/88 S; 350/96 C; 403/14
[58] Field of Search ............ 156/49, 158, 159, 304, 156/502; 29/628 R, 630 F, 630 A, 630 C, 630 D; 174/74 R, 84 R, 88 S; 350/96 R, 96 B, 96 C, 96 BC; 339/65, 66 R, 66 M, 66 T; 403/13, 14

[56] References Cited

U.S. PATENT DOCUMENTS

| 378,021   | 2/1888  | Silliman ................... 174/88 S |
| 825,069   | 7/1906  | Peirce ......................... 403/14 |
| 2,444,075 | 6/1948  | Violette ....................... 156/49 |
| 3,097,035 | 7/1963  | Despard ....................... 339/65 |
| 3,233,202 | 2/1966  | Kyle ......................... 29/630 A |
| 3,241,204 | 3/1966  | Baricevic et al. ............ 403/13 |
| 3,699,651 | 10/1972 | Rueger et al. ............. 29/630 A |
| 3,768,146 | 10/1973 | Braun et al. ............... 350/96 C |
| 3,783,065 | 1/1974  | Stone ....................... 350/96 C X |
| 3,798,099 | 3/1974  | Marcatili .................... 156/158 |
| 3,871,935 | 3/1975  | Gloge et al. ................ 156/158 |
| 3,910,678 | 10/1975 | McCartney et al. ....... 350/96 B X |
| 3,914,015 | 10/1975 | McCartney ................ 350/96 C |
| 3,992,569 | 11/1976 | Hankins et al. ............. 156/49 X |

OTHER PUBLICATIONS

Fenton, "Connections — Metal Connectors Protect Fibers During Termination and in the Field," Electronics, Aug. 5, 1976, pp. 98-100.

*Primary Examiner* — Charles E. Van Horn
*Assistant Examiner* — John E. Kittle

[57] ABSTRACT

Method for splicing optical fiber cables which applies to those cables having an axial core and fibers disposed around the core, parallel to the cable axis or having a slight slant with respect thereto. At the places where splicing will have to be made, when the cable is laid down, the jacket of the cable is removed the fibers are glued on the core and two half-shells are disposed round the glued fibers and encase them. The half-shells are bonded to the core and fibers by gluing under pressure. When the glue has set, the half-shells together with the fibers and cable core are sawn perpendicularly to the cable axis which gives two half-shell segments. These segments have registering bores and splicing is achieved by inserting calibrated columns or pins into these bores.

8 Claims, 19 Drawing Figures

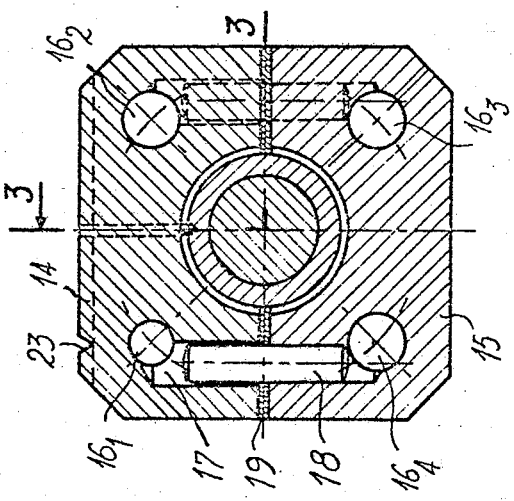
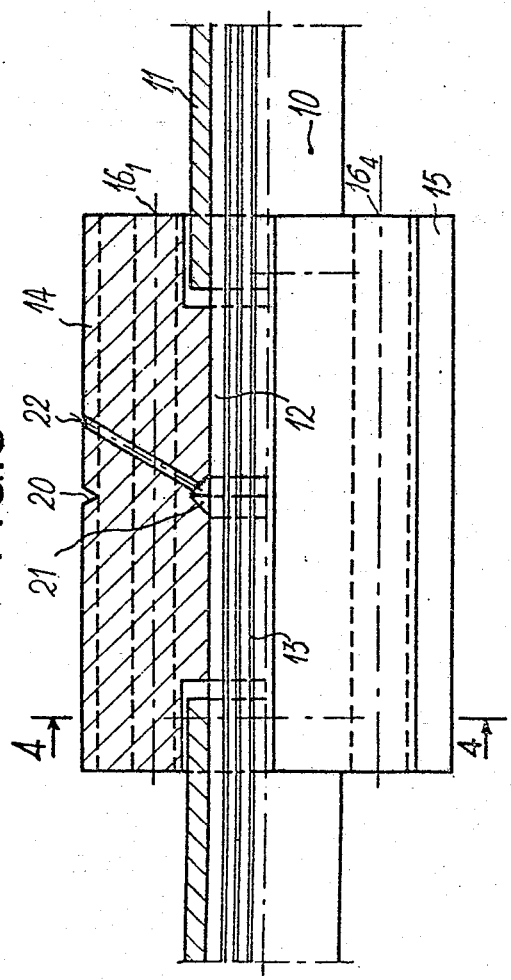
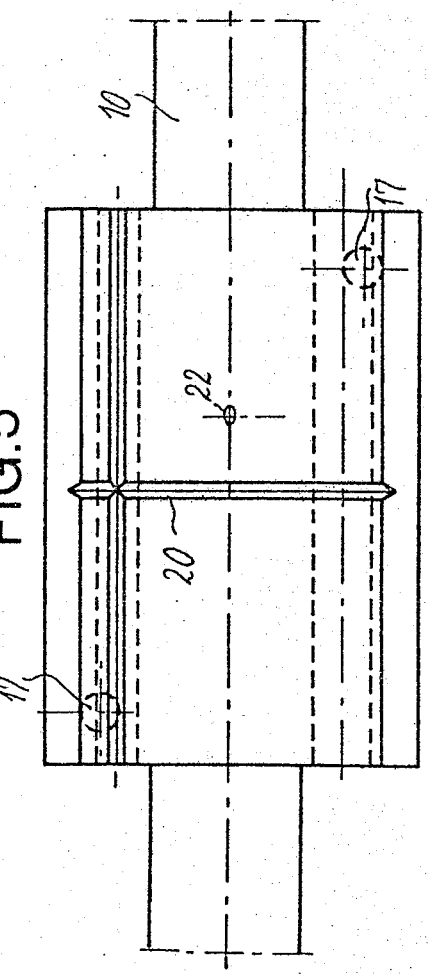

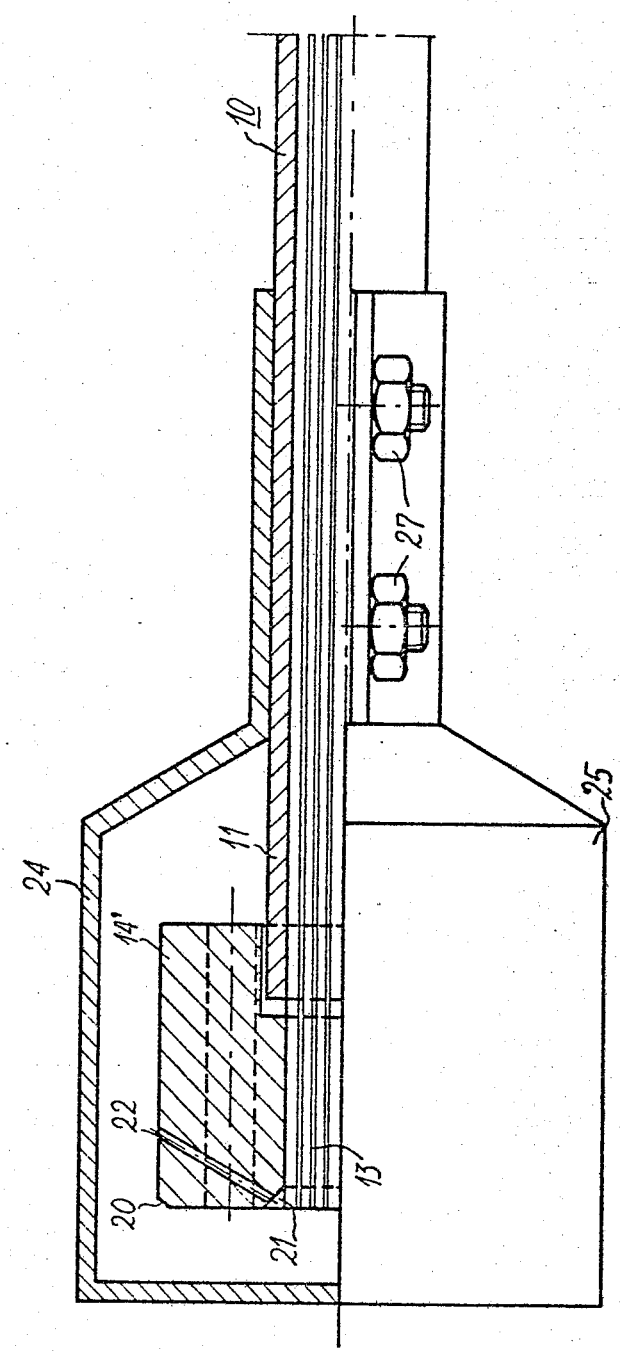

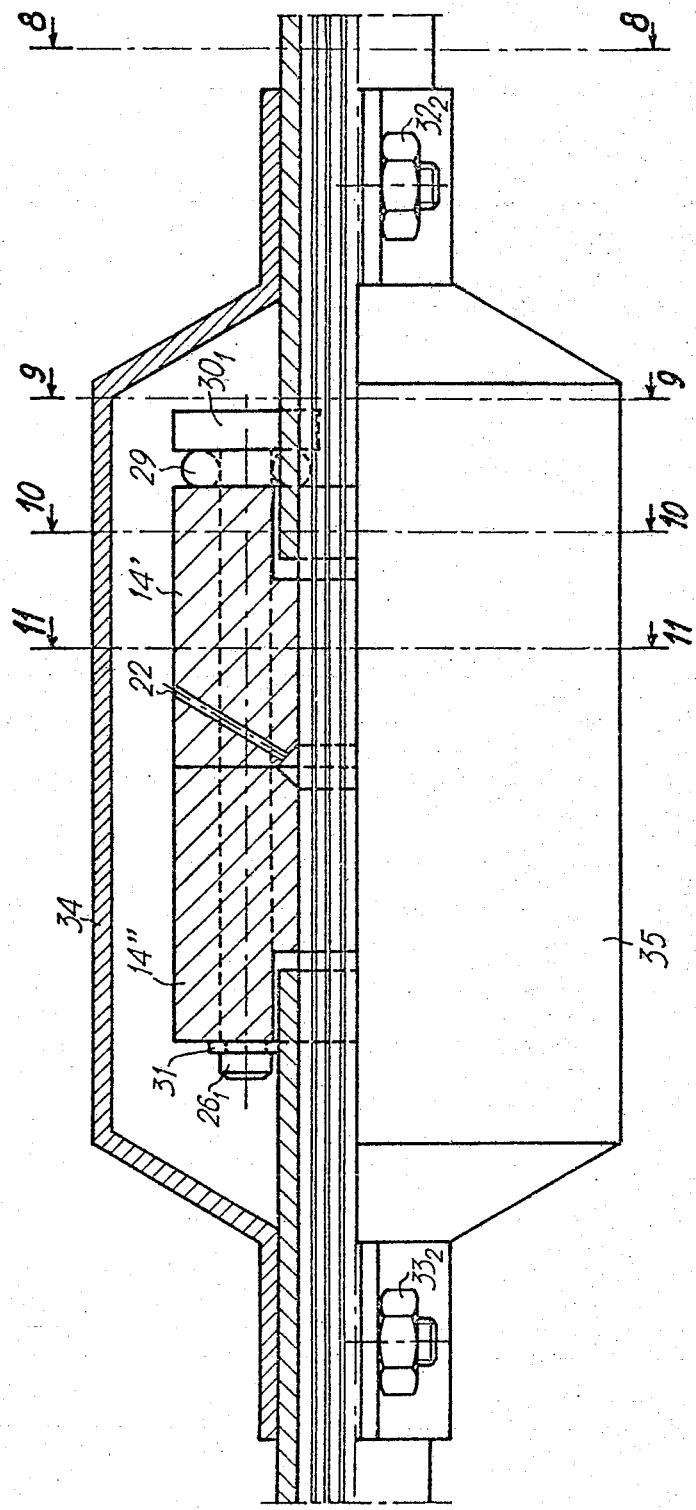

FIG.13
FIG.12
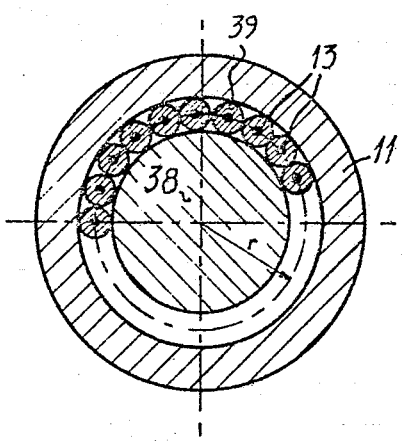
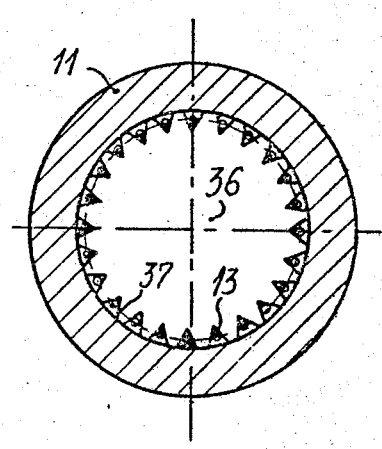
FIG.14
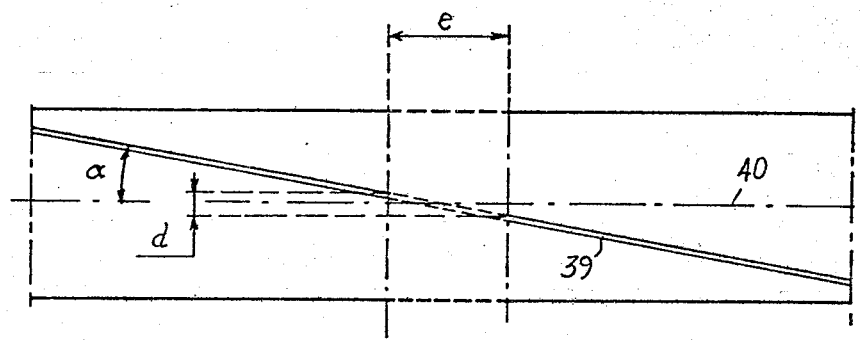

METHOD AND APPARATUS FOR SPLICING OPTICAL FIBER CABLES

BACKGROUND OF THE INVENTION

1. Field of the Invention

This application relates to optical fibers and to apparatus and methods for splicing groups of such fibers formed in cables.

There is currently a great deal of interest in the use of cables of solid core dielectric fibers operating at optical frequencies and such cables are now being laid or are practically in use. Connectors for frequently connecting and disconnecting optical fiber cable sections, which automatically align the fibers, have been developed. These connectors are expensive precision devices.

When an optical fiber cable is being laid, it is not necessary to connect by means of disconnectable connectors the cable sections since the sections have not to be disconnected after laying except perhaps to lengthen one of them or to repair a break. Therefore, the cable sections can be connected by merely splicing the fibers.

2. Description of the Prior Art

An optical fibers splicing method has been proposed in the prior art. According to this method, the fibers are arranged in groups, each fiber group comprising a plurality of fibers secured to a ribbon-like tape. The fiber group segments to be spliced are mounted on the holders of a splicer such that each of the fibers of one segment is aligned approximately coaxially with a fiber on the other segment. The individual fiber ends and the tape ends are cut flat; bonding material, of matching refractive index, is placed on each fiber end of at least one segment, and the two segments placed in contact. To insure accurate alignment of the respective fibers, a cover plate, accurately dimensioned to fit over the fibers, is placed over the adjacent ends of the fibers and left in position until the bonding material sets. Alternatively, the fibers can be spliced to each other by the application of heat.

This splicing method only applies to optical fiber disposed parallel to one another and forming a plane structure.

It is the broad object of the invention to splice optical fibers formed in cables in which the fibers are disposed around a cable core, either parallel to the core axis or helically wound around said core.

SUMMARY OF THE INVENTION

According to the invention, the optical fiber cable, manufactured at the factory by a continuous process, is cut up into sections of predetermined lengths, after being provided with connecting devices. The sections must be numbered or otherwise identified so that they can be connected at the laying site in the order which they occupy in the cable. The sections must therefore necessarily be identified or numbered, although this is not the case with the prior art devices.

The splicing method according to the invention is therefore characterized in that it is applied to a cable whose structure is adapted to these kinds of operations and which is manufactured continuously or in sections of long enough lengths. The method is characterized in that it comprises, at the places determined by the subsequent cable-laying conditions: an operation of unsheathing the cable over a certain length; a rigid connection without any regulation of the fibers to the cable core, for instance, by the gluing of the optical fibers to the core; a rigid attachment to the core and fibers by gluing under pressure or flanging and gluing of two half-shells, an upper and a lower half-shells, preferably of plastics material; a sawing at a predetermined place through the cable and the two half-shells in a direction perpendicular to their longitudinal axis whereby each half-shell is divided into two segments, this being followed or not by a quick polishing optional operation. When the operations for preparing the connection have been completed, each section end is cleaned and protected by means of a grease or oil whose refractive index is adapted to ensure the best possible optical continuity during the connection, the cable end then being given a protective hood. Connection is carried out on the site after removing the protective hood from the two sections whose marking indicates that they must be connected to one another. Assembly is carried out, for instance, by means of four stepped columns which extend into calibrated bores in the half-shell segments. One of the columns has a diameter different from that of the three others, for instance, a smaller diameter, so as to avoid false turning through 180° during assembly. Resilient washers disposed beneath the stepping of the columns enable a slight pressure to be exerted at the splicing plane when the segments are assembled together. An internal circular groove and a feed channel enable the lubrication of the splice to be completed and maintained in time, thus ensuring satisfactory stability during transmission. Two very rigid half-hoods fit over the splice assembly and are secured to the jacket of the two cable sections by flanging or gluing to each section. They prevent forces exerted on the cable from having repercussions at the splice.

The invention will be more clearly understood from the following detailed description of embodiments thereof, with reference to the accompanying drawings, wherein :

BRIEF DESCRIPTION OF THE DRAWINGS

FIG. 3 is a longitudinal view, in axial half-section taken along the line 3—3 in FIG. 4, showing the stripped cable provided with two half-shells ;

FIG. 4 is a cross-sectional view, taken along the line 4—4 in FIG. 3;

FIG. 5 is a plan view of the cable having two assembled half-shells;

FIG. 6 is a view in axial half-section of a prepared and protected cable section terminal, after sawing, but before the connecting operation;

FIG. 7 is a view in longitudinal and radial cross-section showing the ends of two sections after the connecting operation on the site;

FIGS. 12 and 13 are cross-sectional views of optical fiber cables which are particularly well adapted to the kind of connection shown in FIGS. 2–11;

FIG. 14 is a diagram of an optical fiber cable in which the optical fibers are inclined to the cable axis;

DESCRIPTION OF THE PREFERRED EMBODIMENTS

Figure 1A:
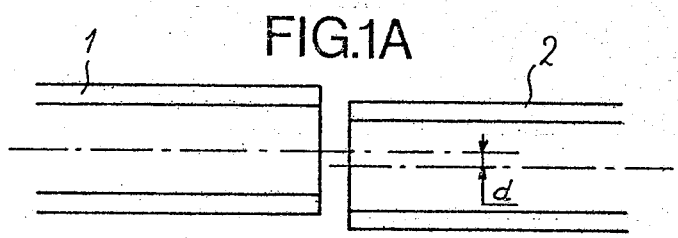
FIGS. 1A - 1D are diagrams showing four possible causes of insertion loss at the connection between two optical fibers formed by a core and a cladding of different refractive indices.

In the embodiments illustrated in FIGS. 2-11, the optical fibers are parallel with the cable axis. When two optical fibers 1, 2 have to be interconnected, an attempt is made to reduce the three following faults to the minimum:

The linear error of connection $\delta$ (FIG. 1A)

Figure 1B:
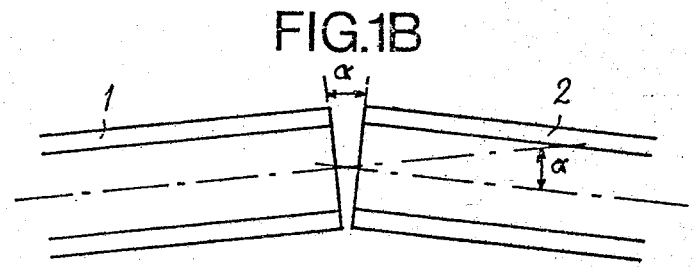

The angular error of connection $\alpha$ (FIG. 1B)

Figure 1C:
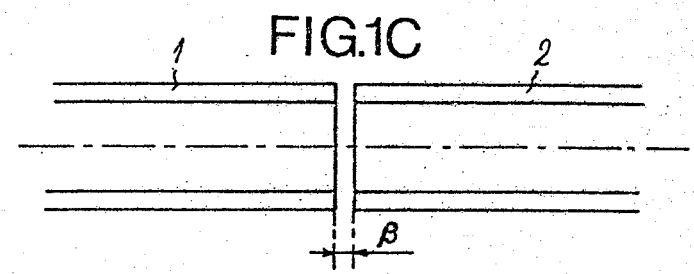

The longitudinal linear error of connection $\beta$ (FIG. 1C).

Figure 1D:
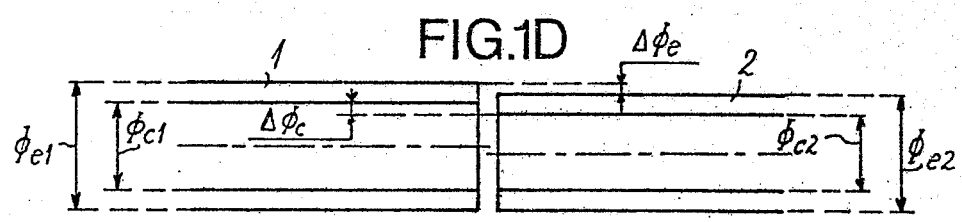
Figure 2:
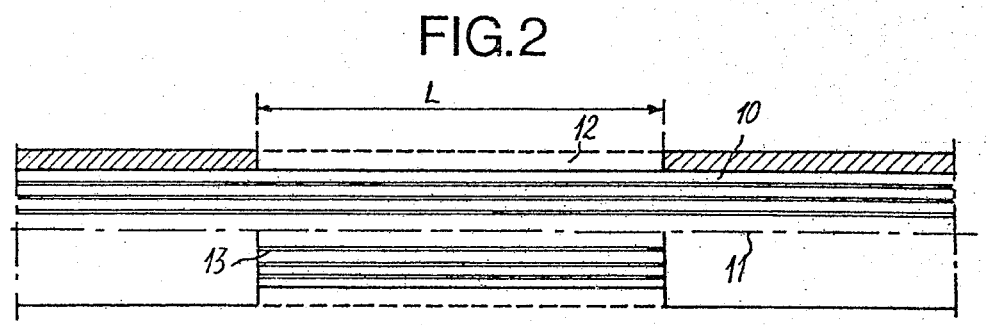
FIG. 2 is a diagram showing an optical fiber cable stripped over a certain length L at the place of the future joint.
Figure 8:
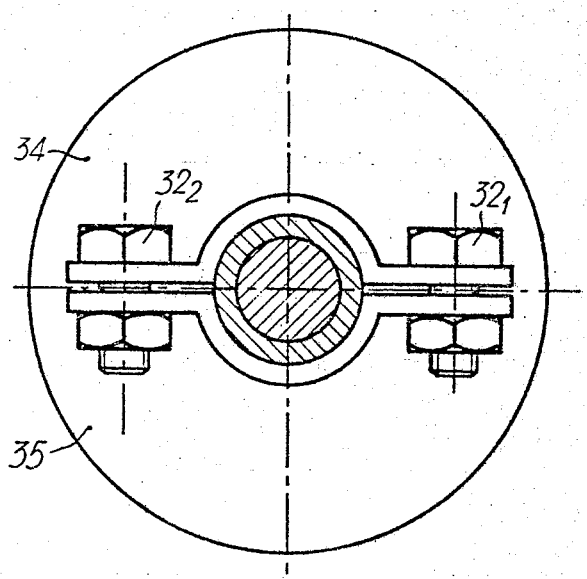
FIGS. 8–11 are cross-sectional views of FIG. 7, taken along the lines 8—8, 9—9, 10—10 and 11—11 in FIG. 7 respectively.
Figure 9:
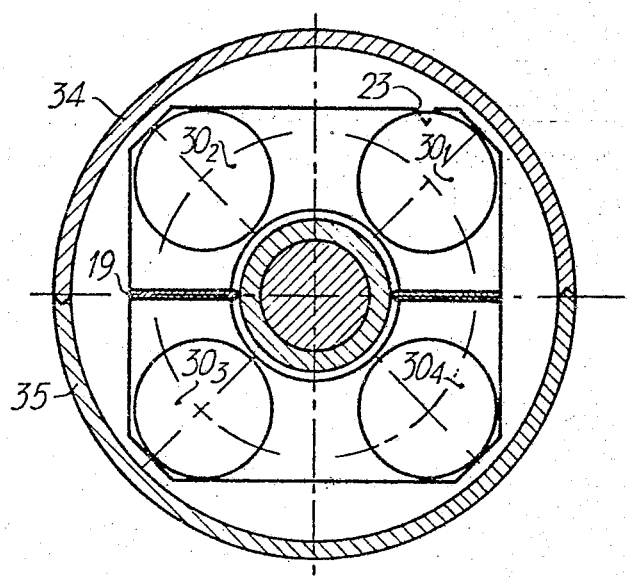
Figure 10:
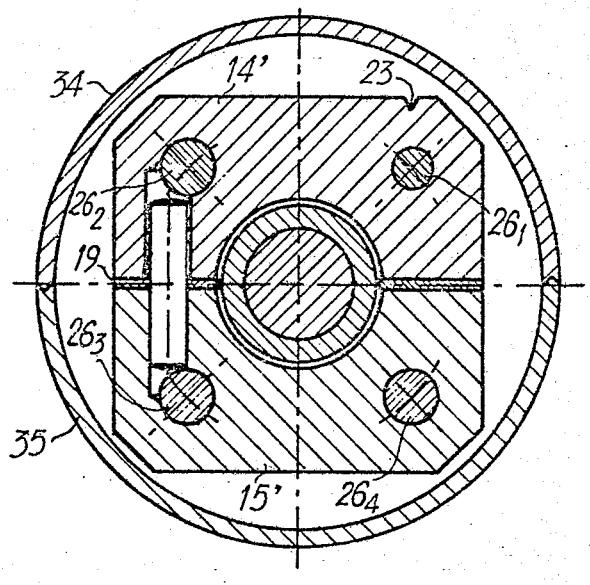
Figure 11:
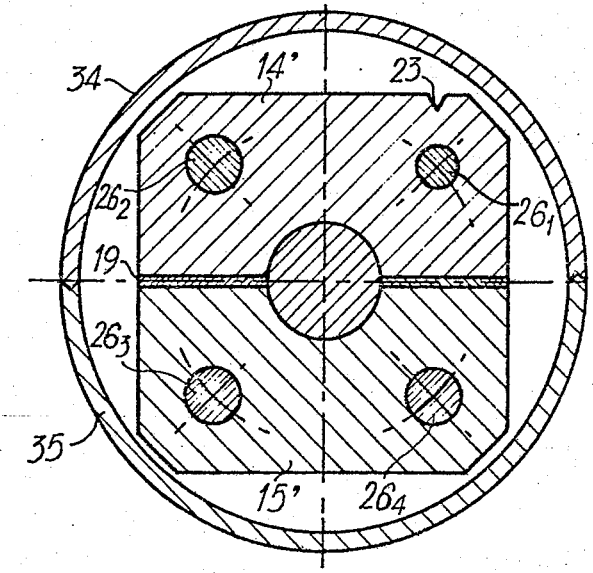

During manufacture, it seems ecomonically prohibitive to avoid a certain tolerance $\Delta\phi_e$ on the outer diameter of the fibers and differences of refraction index gradients which results in a difference in core diameter $\Delta\phi_c$ (FIG. 1D) for two fibers taken at random from manufacturing lots.

The known optical fiber transmission cable connecting members, often using complicated means, allow the first three conditions to be met, some of the connecting devices even taking into account differences in outside diameters, but they are never able to compensate differences in the refractive index radial gradients although in the long run they may form the main source of losses.

The method for connecting optical fiber cables according to the invention enables all these conditions to be met, since after sectioning for purposes of warehousing, transportation and transmission cable laying, the connecting method and device according to the application enable the cable to be reconstituted with the minimum of losses.

In FIG. 1, a cable 10 comprising a protective jacket 11 is stripped over a certain portion 12 of length L to show the fibers 13 parallel with the cable axis around the place where a splice between two sections is to be made, something which can be done only when the splicing plane of the optical fiber cable to be laid is precisely known.

Referring to FIGS. 3-5, the stripped portion 12 of the cable is then surrounded by two half-shells 14, 15, after the fibers 13 have been rigidly held in place by placing a drop of bonding material on the stripped portion. The two half-shells 14, 15 are secured to the bonding material and therefore the fibers 13 by gluing under pressure.

The two half-shells 14 and 15 have the general shape of two half-cylinders and accomodate to each other over a diametral plane. A flexible joint 19 in this plane ensures the sealing tightness of the assembly. A channel 22 terminating in an interval groove 21 allows the introduction under pressure of the bonding material. When the bonding material has set, the half-shells are sawn off along a slight groove 20 which indicates the place of sawing.

Splicing consists in fitting together the half-shell segments resulting from the sawing operation. The half-shells 14 and 15 comprise four longitudinal bores $16_1$ to $16_4$ serving to reconstitute which accurate registration the half-shells from the half-shell segments. One of the bores $16_1$ has a smaller diameter than the three other ones. A longitudinal groove 23 extends on the surface of the upper half-shell for indicating the location of this small diameter bore $16_1$. To make a splice, the half-shell segments terminating the two cables sections to be spliced are fitted together by aligning the bores $16_1$–$16_4$ of the two half-shell segments and introducing in the same calibrated columns.

The half-shells also have two other bores 17 which are perpendicular to the cable axis and adapted to receive two centering rods 18 to ensure the accurate assembly of the two half-shells.

FIG. 6 shows a cable terminal 14'-15' (only the part 14 is shown in transverse cross-section) after the half-shell sawing operation and polishing operation. After sawing, the terminal is effectively cleaned, for instance, by passing it through an ultrasonic basin and its front part 21 is greased using, for instance, a silicone grease or oil whose refractive index is such that when the splice is made such grease ensures optimum optical continuity between the fibers and protects their ends against any pollution. The terminal is then given a protective hood formed by two halfhoods 24, 25 rigidly attached by a flanging to the unstripped portion 11 of the cable 10, thus affording effective protection against impact and dust during the transportation of the cable section. The hood is attached to the cable by means of bolts with nuts 27.

As illustrated in FIGS. 7-11, the complete device for splicing in situ two cable sections is formed by terminals 14'-15' and 14"-15" from which the protective hoods have first been removed. The terminals are assemblied by means of four calibrated stepped columns $26_1$–$26_4$ which extend into the corresponding bores $16_1$–$16_4$ of the half-shell segments. One $26_1$ of the columns has, as already said, a smaller diameter than the others, to avoid wrong accomodation between the half-shell segments, one of them being turned through 180° from its true registration. The assembly position is facilitated by the presence of the locating groove 23 mentioned hereinbefore. After longitudinal locking by means of, for instance, circlip-type washers 31, the resilient O rings 29 disposed beneath the steps $30_1$ to $30_4$ of the columns $26_1$–$26_4$ enable a slight pressure to be exerted at the place of the splice plane. The resulting splice in fact reconstitutes the sectioned fibers and thus meets all the conditions which must be brought together to achieve very low insertion losses. Two grated half-hoods 34, 35, attached by flanging, anchoring, or even gluing in the case of a non-detachable connection, to the unstripped portions of the two spliced cable sections ensure the mechanical rigidity of the assembly and the protection of splice against forces exerted on the cable.

In FIGS. 7-11, the half-hoods 34, 35 are attached by means of bolts with nuts $32_1$, $32_2$; $33_1$, $33_2$.

FIGS. 12 and 13 show two types of prior art optical fiber cable structures, in which the fibers are wound helically, which are particularly suitable for the connecting method illustrated in FIGS. 2 to 11, when the helix pitch is relatively large.

The first structure (FIG. 12) comprises a central core 36 receiving in each of a plurality of peripheral grooves 37 a fiber 13 having a fine elementary protection jacket enabling it to be handled during cable manufacture, and a protection envelope 11. Clearly, therefore, by the method according to the invention, once the outer envelope 11 has been stripped over a certain length, it is easy to attach each fiber in its recess by gluing under pressure and then to proceed to all the splicing operations.

The second structure (FIG. 13) is a more conventional structure. It comprises a central carrier 38, fibers 13 helically would on the central carrier, and a protective envelope 11. The fibers 13 have an individual jacket 39 for protective purposes during cable manufacture. The splicing method is applied under the same conditions as previously. Obviously, these examples of cables are not restrictive, and of course the connecting principle according to the invention can be applied to numerous other optical fiber cable structures.

In some types of cables, the fibers have a direction substantially parallel with the cable axis or can be brought into such a direction by simple handling, in which case the embodiment disclosed in relation to FIGS. 2 to 11 is adequate. On the other hand, as shown by FIG. 14, the fibers 39 can have a known inclined direction in relation to the cable axis 40. This may be the case, inter alia, with the examples of structures illustrated in FIGS. 12 and 13 if the helix pitch is relatively small. FIG. 14 shows that unless simple handling operation has been carried out to align the fibers parallel with the cable axis, the inclined orientation of fibers at an angle $\alpha$ in relation to the cable axis taking account of the thickness $e$ of the material removed by sawing and polishing which is of the order of several microns, causes an offsetting $d = e \operatorname{tg} \alpha$ between the two extremities of the fiber in the splicing plane. In such a case, therefore, the recesses for the stepped columns which position the cable half-shell segments in relation to one another after sawing must correct the offsetting of the fibers.

Figure 15:
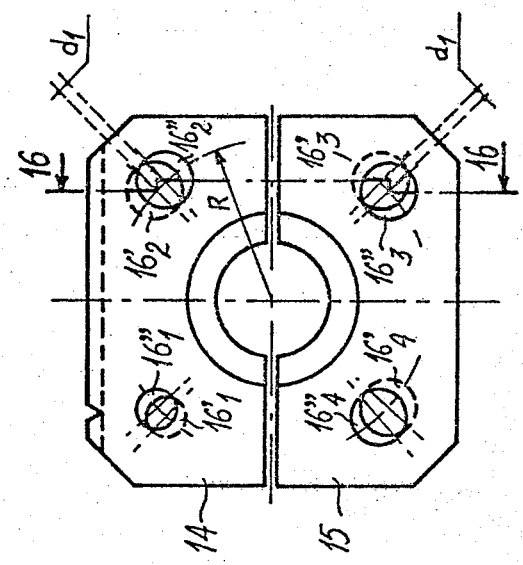
FIG. 15 is a cross-section of a cable of optical fibers which are inclined in relation to the axis, showing the two half-shells of the connection for sawing.
Figure 16:
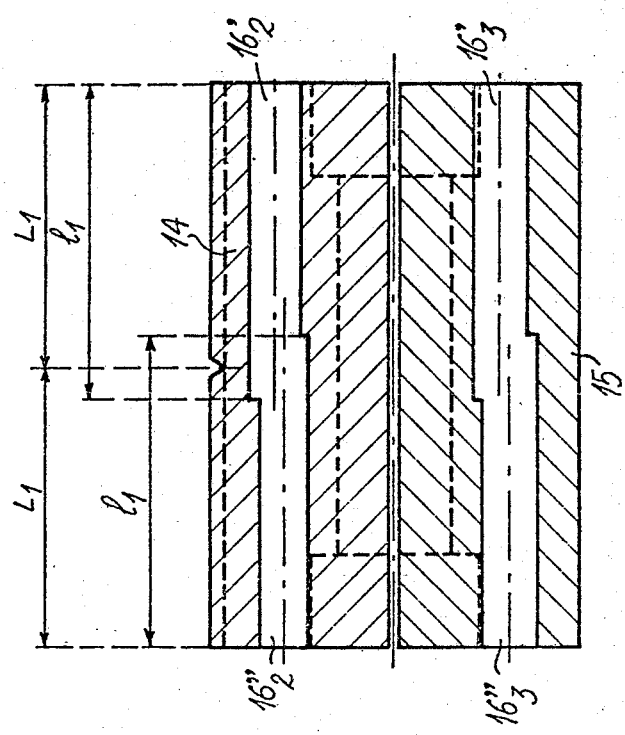
FIG. 16 is a longitudinal section through the half-shells illustrated in FIG. 15, taken along the line 16—16 in FIG. 15.

Referring to FIGS. 15 and 16, bores $16_1$–$16_4$ adapted to act as recesses receiving the columns $26_1$–$26_4$ in the half-shell segments 14'–15' and 14"–15" are replaced by bores $16_1'$–$16_4'$ in the half-shell segment 14'–15' and by bores $16_1''$–$16_4''$ in the half-shell segment 14"–15". The centers of the bores $16_1'$–$16_4'$ are on the same circumference of radius R as the centers of the bores $16_1''$–$16_4''$, but offset by the amount $d_1$. If $L_1$ is the length of the half-shell segments, the bores have a length $p_1$ slightly greater than $L_1$. When, after the sawing and separation of the two couples of half-shells, they are reassembled by inserting the columns, the assembly 14'–15' is given a rotation in relation to the assembly 14"–15" corresponding to the offsetting $d_1$ of the centers of the bores, with $d_1 = d \times (R/r)$ where d and R are as defined above and r denotes the mean radius of the circle on which the axis of the helical fibers are situated.

What we claim is:

1. The method of splicing the optical fibers of an optical fiber cable including an axial core, fibers and a jacket where said fibers are mounted around the cable core and substantially parallel thereto, including the steps of:

unsheathing the cable at spaced out places corresponding to the ends of the cable sections to be spliced;

rigidly securing the optical fibers to the cable core at the unsheathed places;

covering the fibers at the unsheathed places with shell means and rigidly securing said shell means to the fibers, said shell means being provided with longitudinal bores;

sawing said cable core, fibers and shell means along a plane perpendicular to the cable whereby said shell means is divided into two shell means segments registering with each other; and connecting said registering shell means segments by aligning the bores thereof and inserting columns therein.

2. The method of splicing the optical fibers of an optical fiber cable according to claim 1, wherein the step of covering the fibers at the unsheathed places with a shell means consists in covering the same by two half-shells having the general shape of hollow half-cylinders, said half-shells being provided with longitudinal bores and with transverse bores including registering pins.

3. The method of splicing the optical fibers of an optical fiber cable according to claim 1, including the step of securing to the jacket of the cable sections a hood means surrounding the connected shell means segments.

4. The method of splicing the optical fibers of an optical fiber cable according to claim 1, including the optional step of polishing the ends of the sawn fibers.

5. A splicing means for splicing the fibers of two sections of a cable formed of an axial core, fibers and a jacket at a splicing location where the cable jacket is removed, said splicing means comprising means for bonding said fibers to said core at said splicing location, an elongated shell means rigidly secured to said core and fibers and adapted to be sawn along a plane perpendicular to the cable whereby said shell means is divided into shell means segments, bores extending longitudinally in said shell means, columns respectively insertable in said bores for aligning the shell means segment bores and means for locking said columns in said bores.

6. A splicing means for splicing the fibers of two sections of a fiber cable according to claim 5 in which one of the bores and one of the columns have a diameter different from that of the other bores and columns.

7. A splicing means for splicing the fibers of two sections of a fiber cable according to claim 5, comprising an internal groove in the elongated shell means in the sawing plane and a channel extending from the outside of said shell means to said groove.

8. A splicing means for splicing the fibers of two sections of a fiber cable according to claim 5, in which the elongated shell means comprises two half-shells, bores in said half-shells transverse to the shell means axis and registering with each other and pins in said bores for connecting the two half-shells together.

* * * * *